US006150898A

United States Patent [19]

Kushitani et al.

[11] Patent Number: 6,150,898

[45] Date of Patent: Nov. 21, 2000

[54] LOW-PASS FILTER WITH DIRECTIONAL COUPLER AND CELLULAR PHONE

[75] Inventors: Hiroshi Kushitani, Izumisano; Naoki Yuda, Hirakata; Yoshikuni Fujihashi, Osaka; Koji Hashimoto, Kobe, all of Japan

[73] Assignee: Matsushita Electric Industrial Co., Ltd., Japan

[21] Appl. No.: 08/952,008

[22] PCT Filed: Mar. 14, 1997

[86] PCT No.: PCT/JP97/00815

§ 371 Date: Jan. 8, 1998

§ 102(e) Date: Jan. 8, 1998

[87] PCT Pub. No.: WO97/36341

PCT Pub. Date: Oct. 2, 1997

[30] Foreign Application Priority Data

| | | | |
|---|---|---|---|
| Mar. 22, 1996 | [JP] | Japan | 8-65948 |
| Jan. 27, 1997 | [JP] | Japan | 9-12171 |

[51] Int. Cl.[7] .............................. H01P 5/18; H01P 1/203; H04B 1/04

[52] U.S. Cl. .......................... 333/110; 333/115; 333/116; 333/204; 455/114

[58] Field of Search .................................... 333/110, 115, 333/116, 204; 455/114

[56] References Cited

U.S. PATENT DOCUMENTS

| | | | |
|---|---|---|---|
| 4,555,681 | 11/1985 | Dominick et al. | 333/112 |
| 4,706,049 | 11/1987 | Dydyk | 333/110 |
| 4,999,593 | 3/1991 | Anderson | 333/116 X |
| 5,075,646 | 12/1991 | Morse | 333/116 |
| 5,212,815 | 5/1993 | Schumacher | 455/126 |

FOREIGN PATENT DOCUMENTS

| | | |
|---|---|---|
| 64-8802 | 1/1989 | Japan . |
| 8-78916 | 3/1996 | Japan . |
| 10-290108 | 10/1998 | Japan . |

*Primary Examiner*—Benny Lee
*Assistant Examiner*—Barbara Summons
*Attorney, Agent, or Firm*—Parkhurst & Wendel, L.L.P.

[57] ABSTRACT

An integrated component providing the function of both a conventional directional coupler and a low-pass filter having two attenuation poles at a specified frequency band without changing the line length. Stub lines are connected to both ends of a main transmission line of a directional coupler. A frequency of the attenuation poles is adjustable by characteristic impedance, terminating conditions, and line length of the stub lines.

22 Claims, 11 Drawing Sheets

LOW-PASS FILTER WITH DIRECTIONAL COUPLER AND CELLULAR PHONE

FIELD OF THE INVENTION

The present invention relates to low-pass filters with directional couplers suitable for use in the transmission circuits of cellular phones used for mobile communications, and cellular phones employing such low-pass filters with directional couplers.

BACKGROUND OF THE INVENTION

FIG. 10 is a block diagram of the transmission system of an ordinary cellular phone. The monitor signal is coupled out from the power amplified by a power amplifier 1 through a capacity-coupling capacitor 2. An isolator 3 and then a low-pass filter 4 are connected in the system, and the signal is transmitted from the antenna 6 after removing second harmonic spurious and third harmonic spurious energy in the transmission system when a mode switch 5 is turned to the transmission side.

In the above configuration, however, the number of poles in the low-pass filter 4 may have to be increased to fully attenuate amplified second harmonic spurious energy and third harmonic spurious energy in the system. In addition, the isolator 3 connected for preventing reflection signals, regardless of the input position of the mode switch 5, results in a higher price.

DISCLOSURE OF THE INVENTION

The present invention offers a small and inexpensive low-pass filter with directional coupler and a cellular phone employing such a low-pass filter for attenuating high-frequency signals, in particular, second harmonic spurious and third harmonic spurious energy in the system.

A low-pass filter of the present invention eliminates the use of an isolator and connects a stub line to the main transmission line of the directional coupler for coupling out the monitor signal. With this configuration, a specified frequency band can be attenuated with the same line length as directional couplers of the prior art, thereby reducing the number of components in the transmission system of cellular phones.

DESCRIPTION OF THE PREFERRED EMBODIMENTS

First Exemplary Embodiment

A first exemplary embodiment of the present invention is explained with reference to drawings.

Figure 1:
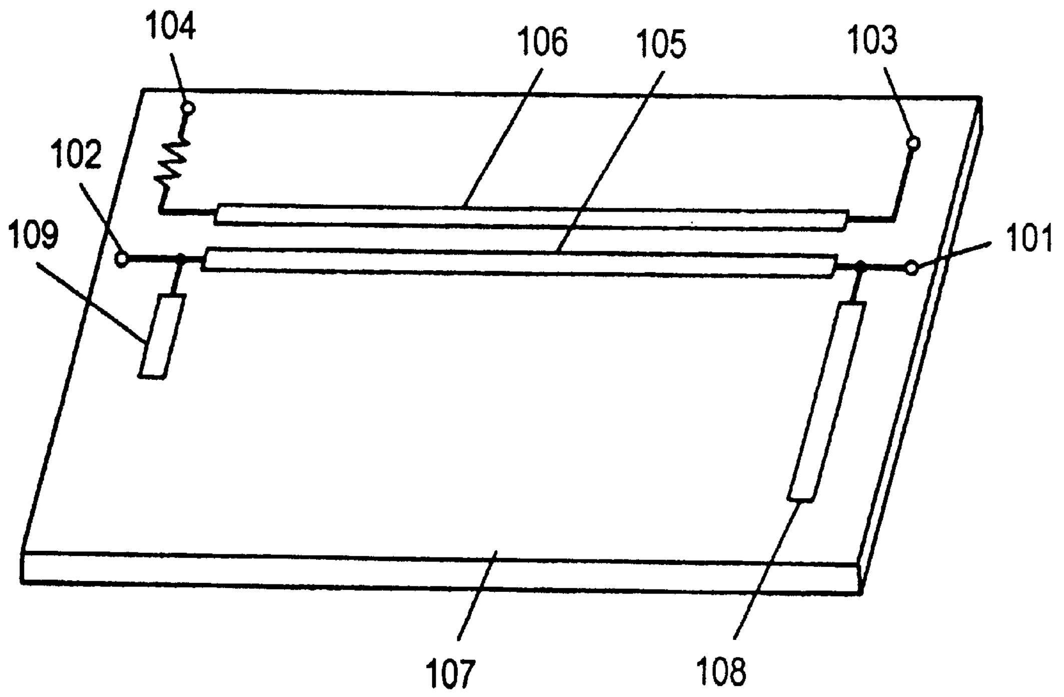
FIG. 1 is a perspective of a low-pass filter with directional coupler in accordance with a first exemplary embodiment of the present invention.

FIG. 1 shows a low-pass filter with directional coupler in the first exemplary embodiment of the present invention which is used in the 900 MHz frequency band. In FIG. 1, a main transmission line 105 which has terminals 101 and 102 at its ends and a sub transmission line 106 which has terminals 103 and 104 at its ends are disposed in parallel on a dielectric board 107 whose bottom face is a shield electrode. The main transmission line 105 and the sub transmission line 106 are electromagnetically coupled, and the terminal 104 terminates at 50Ω to form a directional coupler. The dielectric board 107 consists of alumina and its bottom face is a shield electrode. Since the dielectric constant is small in the dielectric board 107, the characteristic impedance of the transmission lines can be made larger, thereby improving the characteristics of the directional coupler.

The terminals 101 and 102 are connected to stub lines 108 and 109 respectively. These transmission lines and stub lines can be formed using a range of methods including screen printing and film intaglio transfer printing normally used for creating integrated circuit boards.

The operation of the low-pass filter with directional coupler as configured above is explained next.

An input impedance Zi at the contact points of the stub lines 108 and 109 can be calculated as follows when the loss is ignored:

$$Zi = Z0\cdot(Z1 + j\,Z0\tan\beta l)/(Z0 + jZ1\tan\beta l)$$

where

Z0: Characteristic impedance of the line;

β: Phase constant;

l: Line length; and

Z1: Terminating impedance.

This means that the stub lines 108 and 109 act as a series resonance circuit depending on conditions of the characteristic impedance of the line, terminating conditions, and line length, and their frequency characteristics include an attenuation pole. In addition, since the main transmission line 105 acts as an inductance, the present invention forms a low-pass filter having two attenuation poles with the passband frequency (hereafter referred to as ω0) where the line length of the main transmission line 105 is a quarter wavelength (hereafter referred to as λ/4 wavelength).

The above exemplary embodiment offers a component with the function of a low-pass filter with attenuation poles in a specified frequency band in addition to the function of a directional coupler by connecting stub lines to both ends of the main transmission line of the conventional directional coupler and adjusting the characteristic impedance, terminating conditions, and line length of these stub lines.

There are two stub lines in the present exemplary embodiment, but one stub line is also acceptable. A single stub line allows the reduction of the area occupied by the component.

The length of at least one of the stub lines in this exemplary embodiment can also be set to the length which resonates with the double frequency of ω0 (hereafter referred to as 2ω0). This enables the suppression of the system's second harmonic spurious.

This exemplary embodiment can also be realized by setting the line length of one of the stub lines to resonate with 2ω0 and the other line length to resonate with the triple frequency of ω0 (hereafter referred to as 3ω0). This enables the suppression of second harmonic spurious and third harmonic spurious output.

Figure 11:
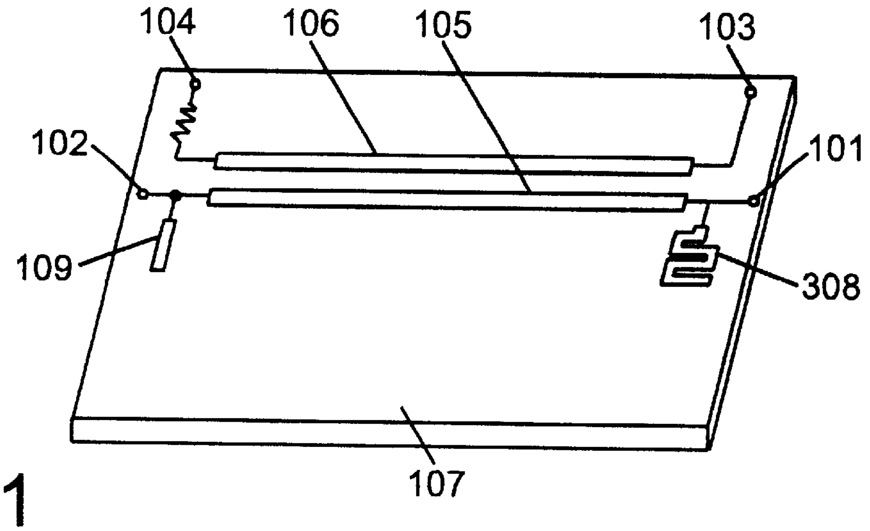
FIGS. 11, 12, and 13 are perspective views of a low-pass filter with differently configured stub lines, respectively.
Figure 12:
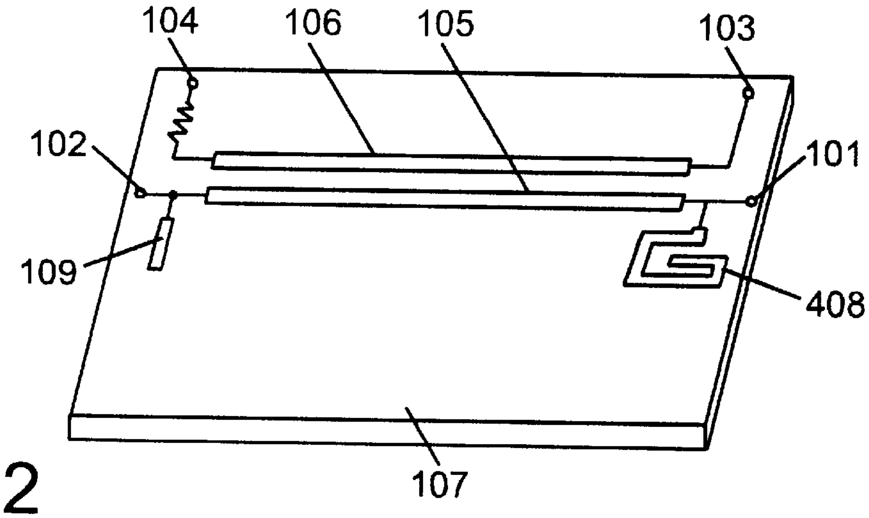
Figure 13:
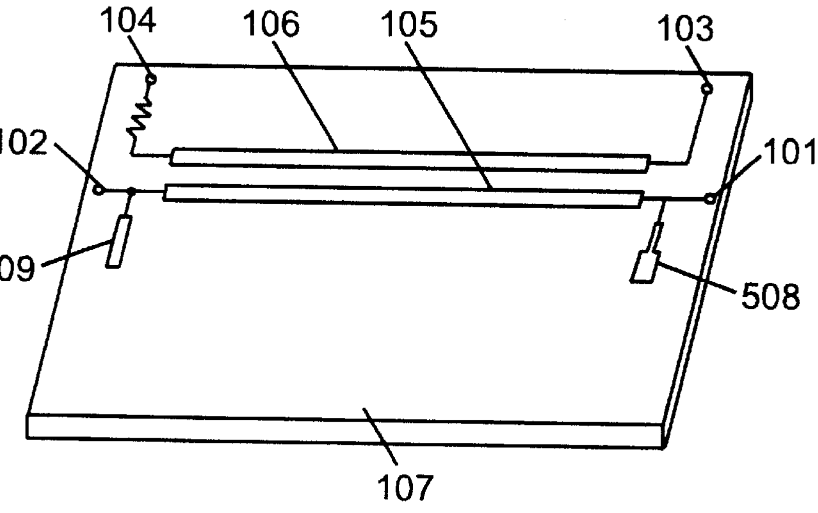

The stub lines in this exemplary embodiment can be replaced with a meander line 308, spiral line 408, or stepped impedance line 508 as shown in FIGS. 11–13, respectively. This allows the reduction of the size of the low-pass filter with directional coupler without changing its characteristics.

The stub lines in this exemplary embodiment can also be replaced with an open stub line. In this case, the component will act as a resonator in which the line length of the stub line resonates with λ/4. This enables shortening of the length of line required for forming the required attenuation pole. Here, two stub lines also show the characteristic of a capacitor in the ω0 band, and the main transmission line and the two stub lines form a π-type 3-pole low-pass filter for improving attenuation characteristics in the high-frequency band.

The 900 MHz frequency band is used in this exemplary embodiment. However, the same effect can be achieved at any frequency for transmitting high frequency signals by the use of the present invention.

Second Exemplary Embodiment

Figure 2:
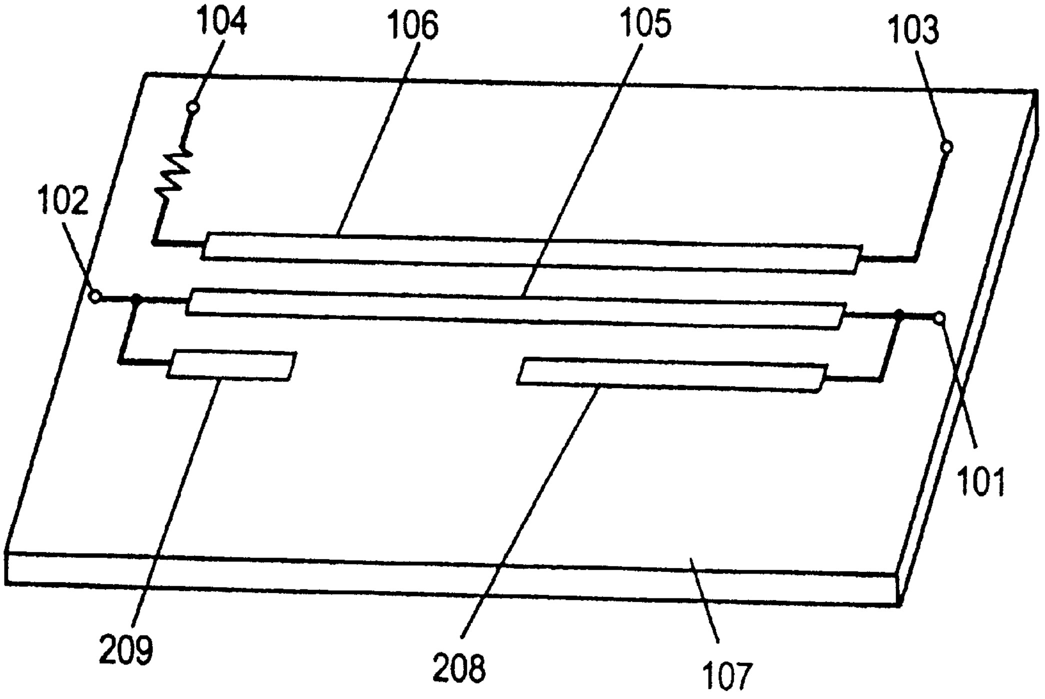
FIG. 2 is a perspective of a low-pass filter with directional coupler in accordance with a second exemplary embodiment of the present invention.

FIG. 2 shows a low-pass filter with directional coupler used in the 900 MHz frequency band in a second exemplary embodiment of the present invention. The low-pass filter with directional coupler in the second exemplary embodiment shown in FIG. 2 has basically the same configuration as that of the first exemplary embodiment shown in FIG. 1. Detailed explanation is therefore omitted by giving the same numeric codes to the same parts.

Stub lines 208 and 209 of the low-pass filter with directional coupler in this exemplary embodiment are disposed parallel to the main transmission line 105 as shown in FIG. 2. The stub lines 208 and 209 are electromagnetically coupled to the main transmission line 105. The other configuration is the same as in the first exemplary embodiment.

The operation of the low-pass filter with directional coupler as configured above is explained next.

In the first exemplary embodiment, the main transmission line acts as an inductance, and both its ends are connected to the stub lines to act as a series resonance circuit for forming a low-pass filter with two attenuation poles. Since lines are formed on a board with low dielectric constant, the length of the stub lines becomes relatively longer, resulting in a larger low-pass filter with directional coupler.

In this exemplary embodiment, stub lines 208 and 209 are disposed parallel to the main transmission line 105 and sub transmission line 106, which enables the realization of a low-pass filter with directional coupler with the same length as a directional coupler.

Figure 3A:
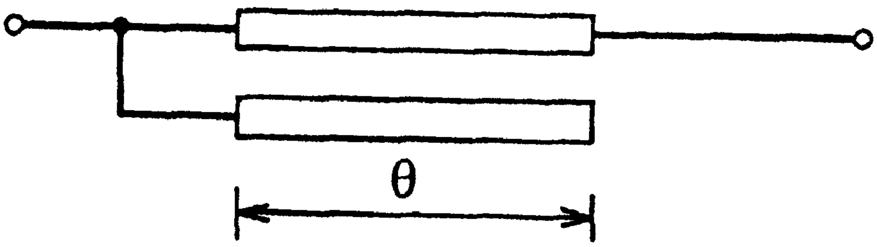
FIGS. 3A and 3B are explanatory views of the relation between a main transmission line and a stub line in accordance with the second exemplary embodiment of the present invention.
Figure 3B:
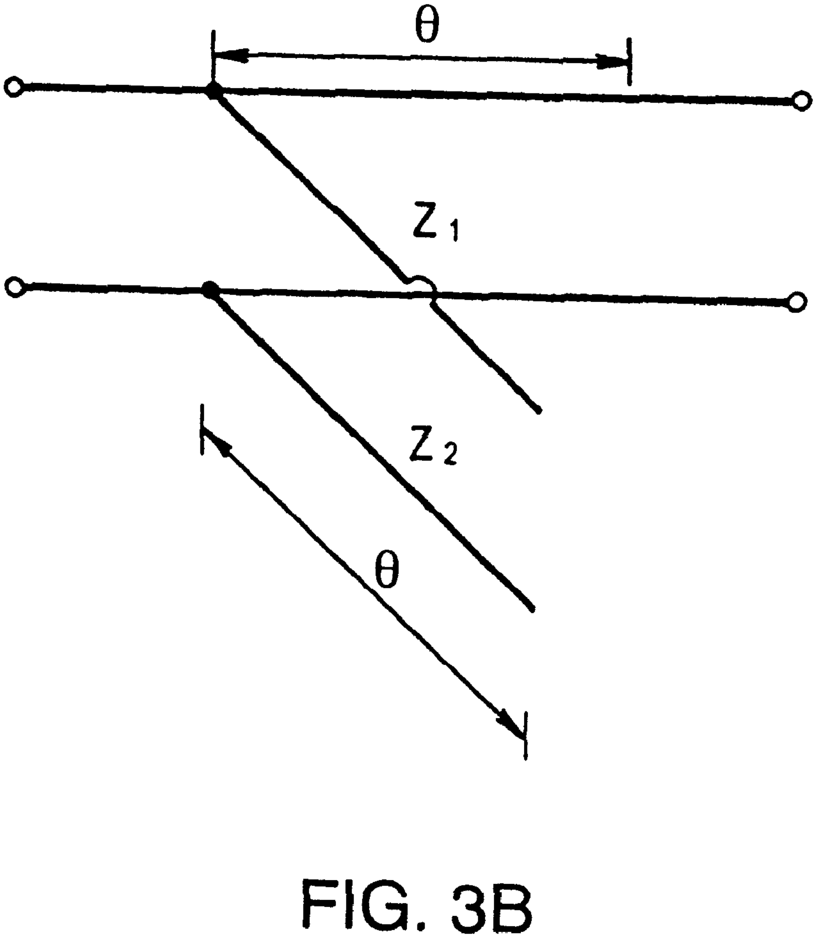

If a portion of the main transmission line 105 which is electromagnetically coupled with the stub line 208 consists of a two-port circuit employing a coupling transmission line having a length θ as shown in FIG. 3(A), its equivalent circuit will be as shown in FIG. 3(B). In this case, the characteristic impedance Z1 of the main transmission line and the characteristic impedance Z2 of the stub line 208 are calculated as follows:

$$Z1=(Ze+Zo)/2$$

$$Z2=(Ze/Zo)\cdot(Ze+Zo)/2$$

where

Ze: Even mode impedance of coupling transmission line and

Zo: Odd mode impedance of coupling transmission line.

As the coupling level of the coupling transmission line rises, generating a larger value for Ze–Zo, the above formula dictates that the characteristic impedance Z2 of the stub line 208 will increase, narrowing the bandwidth for the attenuation pole formed by the stub line 208. The bandwidth for the attenuation pole formed by the stub line 208 similarly narrows when the coupling level of the main transmission line 105 and the stub line 209 is increased.

Accordingly, in this exemplary embodiment, the bandwidth for the attenuation pole formed by the stub lines 208 and 209 can be controlled by changing the width of the main transmission line 105 and the stub line 208, and the distance between the two lines, or the line width of the main transmission line 105 and the stub line 209, and the distance between the two lines.

The 900 MHz frequency band is used in this exemplary embodiment. However, the same effect can be achieved at any frequency for transmitting high frequency signals by the use of the present invention.

Third Exemplary Embodiment

Figure 4:
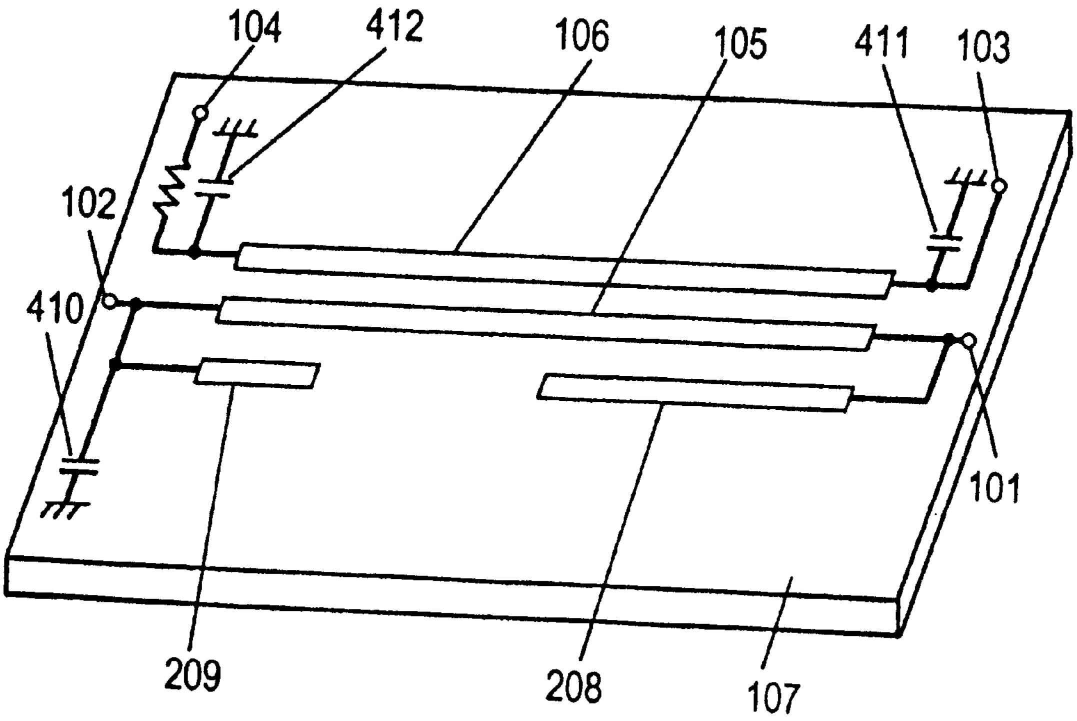
FIG. 4 is a perspective of a low-pass filter with directional coupler in accordance with a third exemplary embodiment of the present invention.

FIG. 4 shows a low-pass filter with directional coupler used in the 900 MHz frequency band in a third exemplary embodiment of the present invention. The low-pass filter with directional coupler in the third exemplary embodiment shown in FIG. 4 has basically the same configuration as that of the second exemplary embodiment shown in FIG. 2. Detailed explanation is therefore omitted by giving the same numeric codes to the same parts.

In this exemplary embodiment, a capacitor 410 is connected to an end of the main transmission line 105, and capacitors 411 and 412 are connected to both ends of the sub transmission line 106. The other configuration is the same as in the second exemplary embodiment.

The operation of the low-pass filter with directional coupler as configured above is explained below.

In the first and second exemplary embodiments, the main transmission line acts as an inductance, and both its ends are connected to the stub lines to form a series resonance circuit which resonates with 2ω0 or 3ω0 to obtain the characteristics of a low-pass filter having two attenuation poles. In this case, the two stub lines also show the characteristics of a capacitor in the w0 band, and form a π-type 3-pole low-pass filter. However, the capacity component of the two stub lines is not exactly the same. When the stub lines 208 and 209 are open stub lines as shown in FIG. 4, and each resonates with 2ω0 and 3ω0 respectively, their admittance is:

$Y=Y0 \tan \beta l$ (whereas $Y0=1/Z0$).

The admittance of an open stub line which resonates with a low frequency is higher than that of an open stub line which resonates with a higher frequency. Accordingly, the capacity component acting on the terminal 101 is larger than that on the terminal 102. There is no capacity component acting on the terminals 103 and 104. Therefore, impedance is not matched in the low-pass filter with directional coupler of the first and second exemplary embodiments.

The third exemplary embodiment realizes a low-pass filter with matched impedance by adjusting the capacitors 410, 411, and 412, thereby correcting each capacity.

The capacity of the capacitor 410 is preferably set to the value obtained by subtracting the capacity component of the stub line 209 from the capacity component of the stub line 208. The capacity of the capacitors 411 and 412 are also preferably set to the capacity component of the stub line 208. These settings allow the best impedance match at w0.

In this exemplary embodiment, insufficient capacity of the stub line 209 is corrected by the capacitor 410 connected to the terminal 102. This can alternatively be achieved by making the line width of the stub line 209 wider than the stub line 208, instead of connecting the capacitor. This allows the number of components to be reduced, and also enables finer adjustment of the capacity.

The 900 MHz frequency band is used in this exemplary embodiment. However, the same effect can be achieved for any frequency for transmitting high frequency by the use of the present invention.

Fourth Exemplary Embodiment

Figure 5:
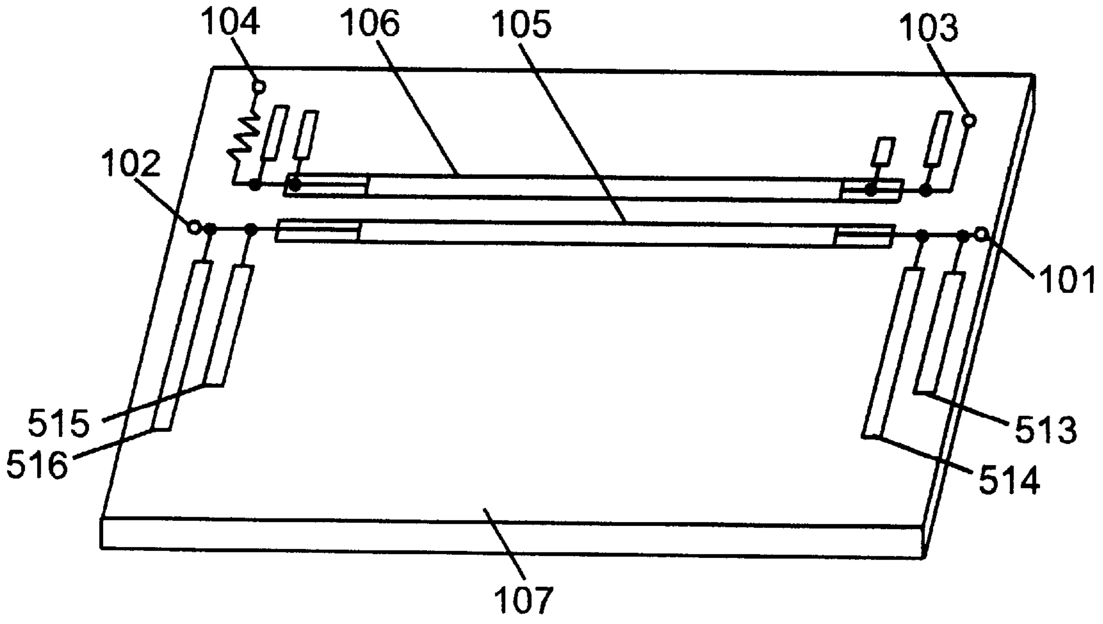
FIG. 5 is a perspective of a low-pass filter with directional coupler in accordance with a fourth exemplary embodiment of the present invention.

FIG. 5 shows a low-pass filter with directional coupler used in the 900 MHz frequency band in a fourth exemplary embodiment of the present invention. The low-pass filter with directional coupler in the fourth exemplary embodiment shown in FIG. 5 has basically the same configuration as that of the first exemplary embodiment shown in FIG. 1. Detailed explanation is therefore omitted by giving the same numeric codes to the same parts.

In this exemplary embodiment, the stub lines 513 and 514 are connected in parallel, and the stub lines 515 and 516 are also connected in parallel so that each pair forms a capacitor in the low-pass filter with directional coupler. The input impedance Zi at the contact points of stub lines 513, 514, 515, and 516 is calculated as follows when the loss is ignored:

$$Zi=Z0\cdot(Z1+jZ0\tan\beta l)/(Z0+jz1\tan\beta l)$$

whereas:

Z0: Characteristic impedance of line;

β: Phase constant;

l: Line length; and

Z1: Terminating impedance.

Since the stub lines 513, 514, 515, and 516 act as a series resonance circuit depending on conditions of characteristic impedance, terminating conditions, and the line length, the present invention forms a π-type 3-pole low-pass filter having two attenuation poles with the frequency ω0 where the line length of the main transmission line 105 is the λ/4 wavelength. Here, the capacity component of stub lines 513 and 514 forms one of the capacitors in the low-pass filter, thereby relatively narrowing the stub lines compared to those of the first exemplary embodiment. The same effect is achieved for the capacity component of the stub lines 515 and 516.

As described above, the fourth exemplary embodiment offers a small low-pass filter with directional coupler by dividing capacity, thereby narrowing the stub lines.

There are four stub lines in this exemplary embodiment, but this number can be reduced to one to three lines, or increased to more than five lines. This allows the reduction of the area occupied by components.

The length of at least one of the stub lines in this exemplary embodiment can be made to the length which resonates with 2ω0. This enables the suppression of the second harmonic spurious energy.

The length of at least one of the stub lines in this exemplary embodiment can be made to the length which resonates with 3ω0. This allows the suppression of the third harmonic spurious energy.

Furthermore, at least one of the stub lines in this exemplary embodiment can be made to the length which resonates with 2ω0 and at least one of the stub lines can be made to resonate with 3ω0. This allows the suppression of both the second harmonic spurious and the third harmonic spurious signals.

The length of at least one of the stub lines in this exemplary embodiment can also be made to the length which resonates with a frequency other than 2ω0 or 3ω0. This allows the suppression of frequencies other than the second harmonic spurious and the third harmonic spurious signals.

The length of at least one of the stub lines in this exemplary embodiment can also be made to the length which resonates with a specified frequency. This allows the suppression of spurious output of a specified frequency.

The stub lines in this exemplary embodiment are connected on the same side, but the same effect can also be achieved when the lines are connected to the opposite side i.e. to the ends of the subtransmission line 106 in the same manner as the capacitors 411 and 412 in FIG. 4.

The frequency band of 900 MHz is used in this exemplary embodiment. However, the same effect can be achieved for any frequency for transmitting high frequency by the use of the present invention.

Fifth Exemplary Embodiment

Figure 6:
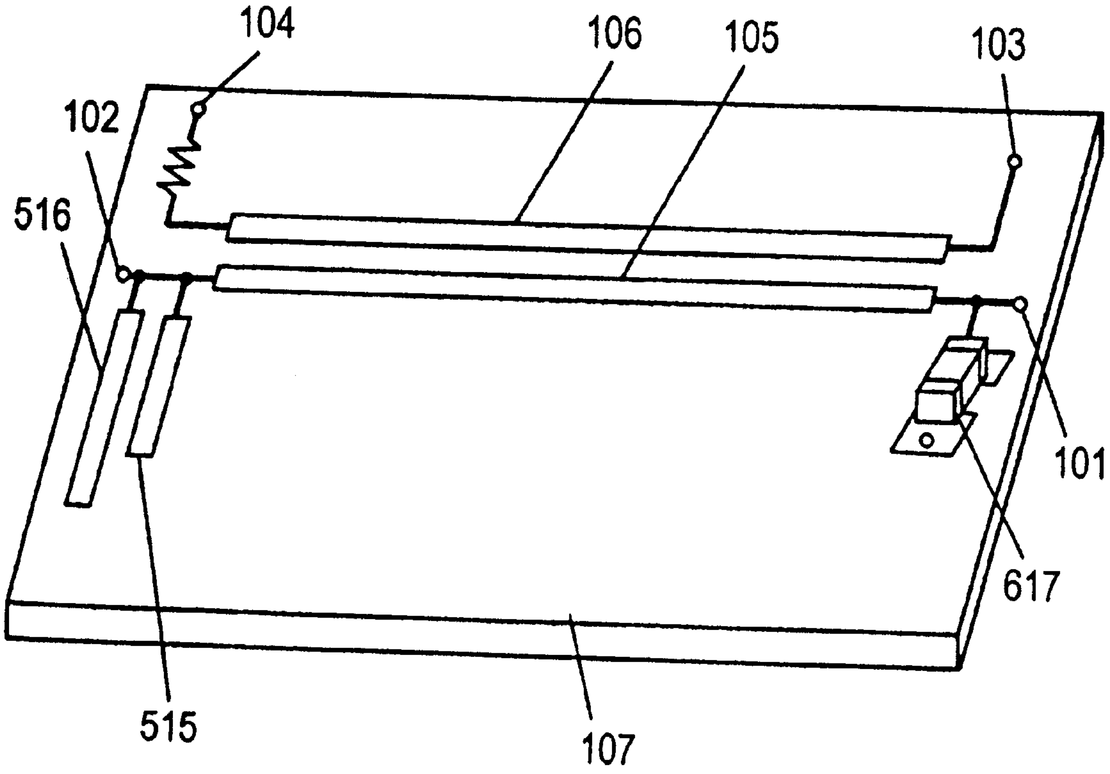
FIG. 6 is a perspective of a low-pass filter with directional coupler in accordance with a fifth exemplary embodiment of the present invention.

FIG. 6 shows a low-pass filter with directional coupler used in the 900 MHz frequency band in a fifth exemplary embodiment of the present invention. The low-pass filter with directional coupler in the second exemplary embodiment shown in FIG. 6 has basically the same configuration as that of the fourth exemplary embodiment shown in FIG. 5. Detailed explanation is therefore omitted by giving the same numeric codes to the same parts.

In the fifth exemplary embodiment, at least one of capacities connected to the main transmission line 105 is a stub line, and a chip capacitor is used for the remaining capacity. The other configuration is the same as that of the fourth exemplary embodiment.

The operation of the low-pass filter with directional coupler as configured above is explained next.

In the fourth exemplary embodiment, the main transmission line 105 acts as an inductance. Stub lines are connected at both ends of the main line 105 to act as a series resonant circuit showing the capacity at the frequency ω0 for forming a low-pass filter having attenuation pole. However, for attenuating the double frequency of 900 MHz on an alumina board, for example, the length of the stub line becomes relatively long, e.g., 13.4 mm, resulting in a larger low-pass filter with directional coupler.

In this exemplary embodiment, a chip capacitor 617 is connected to the main transmission line 105 as capacity. The length of an applicable chip capacitor is 1 mm.

As mentioned above, this exemplary embodiment realizes a smaller low-pass filter with directional coupler by employing a stub line as one of capacities connected to the main transmission electrode line and a chip capacitor for the remaining capacity.

The 900 MHz frequency band is used in this exemplary embodiment. However, the same effect can be achieved at any frequency for transmitting high frequency signals by the use of the present invention.

Sixth Exemplary Embodiment

Figure 7:
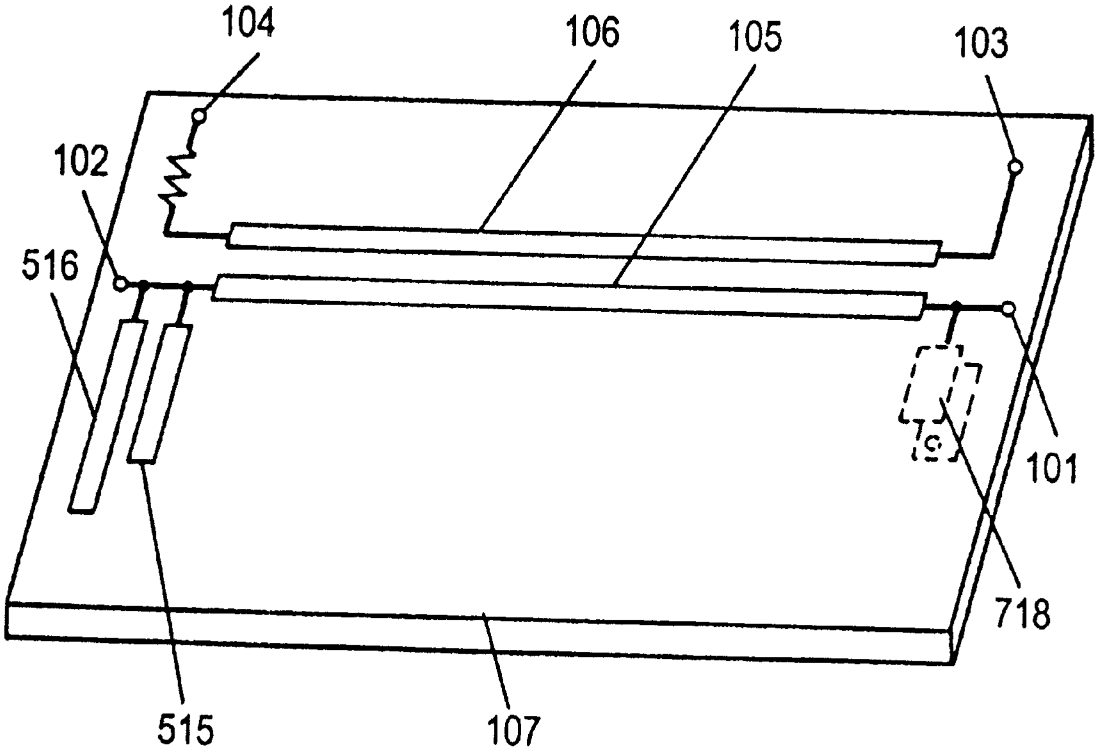
FIG. 7 is a perspective of a low-pass filter with directional coupler in accordance with a sixth exemplary embodiment of the present invention.

FIG. 7 shows a low-pass filter with directional coupler used in the 900 MHz frequency band in a sixth exemplary embodiment of the present invention. The low-pass filter with directional coupler in the sixth exemplary embodiment shown in FIG. 7 has basically the same configuration as that of the fourth exemplary embodiment shown in FIG. 5. Detailed explanation is therefore omitted by giving the same numeric codes to the same parts.

In the sixth exemplary embodiment, at least one of the capacities connected to the main transmission line is a stub line, and an internal capacity 718 is used for the remaining capacity. The other configuration is the same as that of the fourth exemplary embodiment.

The operation of the low-pass filter with directional coupler as configured above is explained next.

In the fourth exemplary embodiment, the main transmission line 105 acts as an inductance. Stub lines are connected at both ends of the main line 105 to act as a series resonant circuit showing the capacity at the frequency ω0 for forming a low-pass filter having attenuation pole. However, for the attenuating double frequency of 900 MHz on an alumina board, for example, the length of stub line becomes relatively long, e.g., 13.4 mm, resulting in a larger low-pass filter with directional coupler.

In this exemplary embodiment, an internal capacitor 718 is connected to the main transmission line 105. The internal capacity can be formed with a length less than a few millimeters.

As mentioned above, this exemplary embodiment realizes a smaller low-pass filter with directional coupler by employing a stub line as one of capacities connected to the main transmission line and an internal capacitor for the remaining capacity.

The 900 MHz frequency band is used in this exemplary embodiment. However, the same effect can be achieved at any frequency for transmitting high frequency signals by the use of the present invention.

Seventh Exemplary Embodiment

Figure 8:
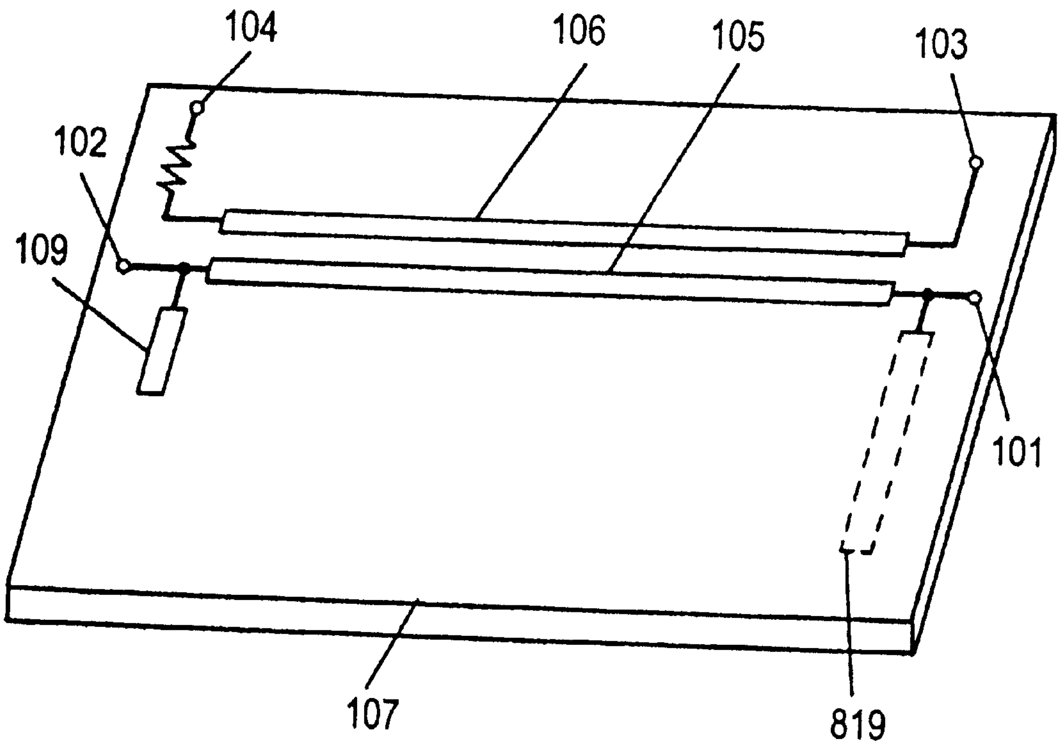
FIG. 8 is a perspective of a low-pass filter with directional coupler in accordance with a seventh exemplary embodiment of the present invention.

FIG. 8 shows a low-pass filter with directional coupler used in the 900 MHz frequency band in a seventh exemplary embodiment of the present invention. The low-pass filter with directional coupler in the seventh exemplary embodiment shown in FIG. 8 has basically the same configuration as that of the first exemplary embodiment shown in FIG. 1. Detailed explanation is therefore omitted by giving the same numeric codes to the same parts.

In the seventh exemplary embodiment, a stub line connected to the main transmission line is an internal stub line 819 inside the board. The rest of the configuration is the same as that of the first exemplary embodiment.

The operation of the low-pass filter with directional coupler as configured above is explained next.

Conditions of a stub line formed on the board using methods such as screen printing and concave printing normally used for creating integrated circuit boards is difficult to be adjusted due to limitations in formation methods. In addition, the line is likely to be affected by external factors after formation. Since the stub lines in the present invention are finely adjusted by its characteristics impedance, terminating conditions, and line length, characteristics of this type of stub line may not be stabilized.

The seventh exemplary embodiment offers a low-pass filter with directional coupler which maintains the initial condition of the line when it is formed, and prevents external influence by connecting a stub line formed inside the board to the main transmission line 105.

One internal stub line is provided in this exemplary embodiment. It will be apparent that two or more internal stub lines can be provided. In this case, characteristics of low-pass filter with directional coupler can be further stabilized.

In this exemplary embodiment, a stub line is provided inside the board, but the entire low-pass filter with directional filter can also be provided inside. It will further stabilize characteristics of low-pass filter with directional coupler.

The 900 MHz frequency band is used in this exemplary embodiment. However, the same effect can be achieved at any frequency for transmitting high frequency signals by the use of the present invention.

Eighth Exemplary Embodiment

Figure 9:
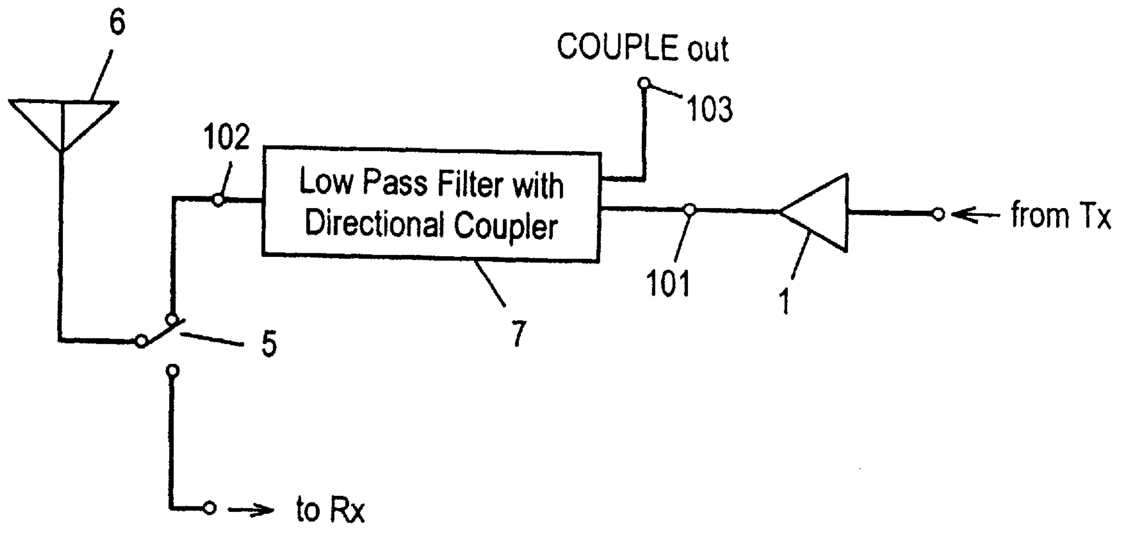
FIG. 9 is a block diagram of a transmission system in a cellular phone employing a low-pass filter with directional coupler of the present invention.
Figure 10:
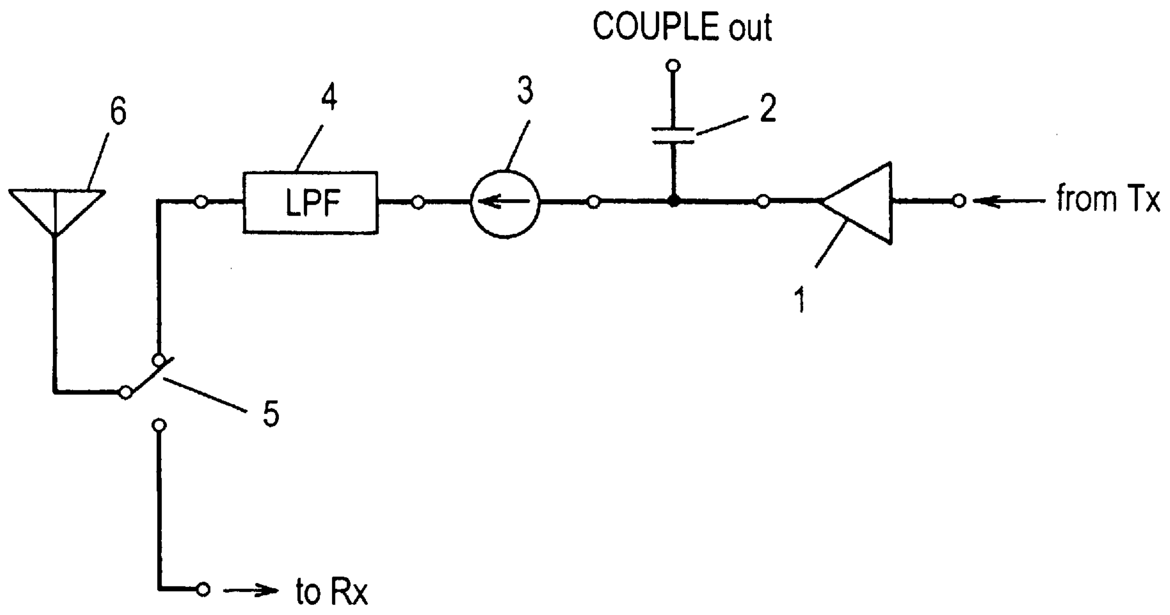
FIG. 10 PRIOR ART
FIG. 10 is a block diagram of a transmission system in a cellular phone of the prior art.

FIG. 9 shows an output circuit of the transmission system in a cellular phone employing a low-pass filter with directional coupler in the eighth exemplary embodiment. The low-pass filter with directional coupler employed in this exemplary embodiment can be one of the first to seventh exemplary embodiments.

In FIG. 9, the terminal 101 is connected to a power amplifier 1, and the terminal 102 is connected to a mode switch 5. The terminal 103 is used as a monitor terminal, and the terminal 104 (not shown) is left as it is terminating at 50Ω.

The operation of the output circuit of the transmission system in the cellular phone as configured as above is explained below.

The power amplifier 1 amplifies the system signal, and the signal is transmitted from an antenna 6 through a low-pass filter with directional coupler 7 and the mode switch 5. Here, high-frequency band energy in the system, particularly second harmonic spurious and third harmonic spurious signals are attenuated by the low-pass filter with directional coupler 7, and is not transmitted to the antenna. The monitor signal can also be coupled out by the directional coupler.

This exemplary embodiment offers a smaller and more inexpensive cellular phones by the use of a low-pass filter with directional coupler of the present invention which enables to reduce the number of components in the output circuit of the transmission system in cellular phones.

INDUSTRIAL APPLICABILITY

The present invention provides a component with an additional function of a low-pass filer having an attenuation pole at a specified frequency band without changing the line length by connecting a stub line to a main transmission line of a directional coupler. The bandwidth of the attenuation pole can also be controlled by electromagnetically connecting the stub line and the main transmission line. Impedance of the low-pass filter with directional coupler can also be matched by grounding both ends of the main and sub transmission lines through a capacitor. The use of the low-pass filter with directional coupler of the present invention in the output circuit of the transmission system in a cellular phone reduces the number of components and realizes a smaller and less expensive cellular phone. The present invention functions as a low-pass filter for attenuating unwanted frequencies and a directional coupler by dividing capacities and providing at least one stub line. The width of the stub line can be narrowed by dividing the capacity, realizing a smaller low-pass filter with directional coupler. The number of components can be reduced and a smaller and less expensive cellular phone can be realized by adopting the low-pass filter with directional coupler of the present invention in the transmission circuit of the cellular phone.

What is claimed is:

1. A low-pass filter with directional coupler comprising:

a directional coupler having a main transmission line and a sub transmission line electromagnetically connected and disposed parallel to each other on the same dielectric board; and a stub line connected only to one end or respective stub lines connected only to each end of said main transmission line, each said stub line forming a series resonance circuit, and a resonance frequency of said series resonance circuit being adjustable by at least one of characteristic impedance, terminating conditions, and line length of said stub line.

2. A low-pass filter with directional coupler as defined in claim 1, wherein the respective stub lines are connected to each end of said main transmission line of the directional coupler, said respective stub lines being disposed on lengthwise direction of said main transmission line of the directional coupler and being electromagnetically connected with said main transmission line.

3. A low-pass filter with directional coupler as defined in claim 1, wherein the respective stub lines are connected to each end of said main transmission line of the directional coupler.

4. A low-pass filter with directional coupler as defined in claim 3, wherein at least one of said stub lines have the line length which resonates with a double frequency of the passband frequency of the low-pass filter.

5. A low-pass filter with directional coupler as defined in claim 3, wherein at least one of said stub lines has the line length which resonates with a triple frequency of the passband frequency of the low-pass filter.

6. A low-pass filter with directional coupler as defined in claim 3, wherein one of said stub lines has the line length which resonates with a double frequency of the passband frequency of the low-pass filter and the other stub line has the line length which resonates with a triple frequency of the passband frequency.

7. A low-pass filter with directional coupler as defined in claim 6, wherein a respective capacitor is connected between a terminal connected to said stub line which resonates with the triple frequency and GND, and between each terminal of the sub transmission line of the directional coupler and GND.

8. A low-pass filter with directional coupler as defined in claim 6, wherein the line width of the stub line which resonates with the triple frequency is broader than the width of the stub line which resonates with the double frequency.

9. A low-pass filter with directional coupler as defined in claim 1, wherein said stub line is one of a meander line, spiral line and stepped impedance line.

10. A low-pass filter with directional coupler as defined in claim 1, wherein said stub line is an open stub line.

11. A low-pass filter with directional coupler as defined in claim 1, wherein said stub line is disposed inside the board.

12. A cellular phone employing a low-pass filter with directional coupler as defined in claim 1 in a transmission circuit.

13. A low-pass filter with directional coupler comprising:

a directional coupler which comprises a main transmission line and a sub transmission line electromagnetically connected and disposed parallel to each other on the same dielectric board and a parallel circuit having a plurality of capacity components provided on at least one end of the main transmission line of said directional coupler, said capacity components including at least one stub line, said stub line forming a series resonance circuit, and a resonance frequency of said series resonance circuit being adjustable by at least one of characteristic impedance, terminating conditions, and line length of said stab line.

14. A low-pass filter with directional coupler as defined in claim 13, wherein at least one of said stub lines has the line length which resonates with a double frequency of the passband frequency.

15. A low-pass filter with directional coupler as defined in claim 13, wherein at least one of said stub lines has the line length which resonates with a triple frequency of the passband frequency.

16. A low-pass filter with directional coupler as defined in claim 13, wherein one of said stub lines have the line length which resonate with a double frequency of the passband frequency of the low-pass filter and at least one other stub line has the line length which resonates with a triple frequency of the passband frequency.

17. A low-pass filter with directional coupler as defined in claim 13, wherein at least one of said stub lines has the line length which resonates with a frequency other than double frequency and triple frequency.

18. A low-pass filter with directional coupler as defined in claim 13, wherein a parallel circuit is provided to one end of the main transmission line of the directional coupler, said parallel circuit having a plurality of capacity components, including at least one stub line; and a chip component is provided on the other end of the main transmission line, said chip component having a capacity component.

19. A low-pass filter with directional coupler as defined in claim 13, wherein a parallel circuit is connected to one end of the main transmission line of the directional coupler, said parallel circuit having a plurality of capacity components including at least one stub line; and an internal capacity component is disposed in a board and provided to the other end of the main transmission line of the directional coupler.

20. A low-pass filter with directional coupler as defined in claim 13 wherein said parallel circuit having a plurality of capacity components is connected to the main transmission line side of the directional coupler.

21. A low-pass filter with directional coupler as defined in claim 13, wherein said parallel circuit having a plurality of capacity components is connected to both the main transmission line side and the sub transmission line side of the directional coupler.

22. A low-pass filter with directional coupler comprising:

a directional coupler which comprises a main transmission line and a sub transmission line electromagnetically connected and disposed in parallel with each other on the same dielectric board;

a parallel circuit having a plurality of capacity components disposed on one end of said main transmission line of the directional coupler, said capacity components including at least one stub line; and at least one stab line disposed on the other end of said main transmission line of the directional coupler, said stub line having the line length which resonates with a specified frequency, said stub line forming a series resonance circuit, and a resonance frequency of said series resonance circuit being adjustable by at least one of characteristic impedance, terminating conditions, and line length of said stub line.

* * * * *